(12) United States Patent
Silverstein

(10) Patent No.: US 7,634,152 B2
(45) Date of Patent: Dec. 15, 2009

(54) SYSTEM AND METHOD FOR CORRECTING IMAGE VIGNETTING

(75) Inventor: D. Amnon Silverstein, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 816 days.

(21) Appl. No.: 11/074,979

(22) Filed: Mar. 7, 2005

(65) Prior Publication Data

US 2006/0204128 A1 Sep. 14, 2006

(51) Int. Cl.
*G06K 9/40* (2006.01)
*G06K 9/36* (2006.01)

(52) U.S. Cl. ............... 382/275; 382/254; 382/276; 382/260; 382/261

(58) Field of Classification Search ............... 382/275
See application file for complete search history.

(56) References Cited

U.S. PATENT DOCUMENTS

| | | | |
|---|---|---|---|
| 4,306,787 A * | 12/1981 | Fukuhara et al. ............ 396/234 |
| 4,414,635 A * | 11/1983 | Gast et al. ................. 382/165 |
| 4,653,901 A * | 3/1987 | Loce et al. .................. 355/71 |
| 4,792,823 A * | 12/1988 | Fujino et al. ................ 396/63 |
| 4,878,745 A * | 11/1989 | Endo et al. ................. 359/772 |
| 4,884,140 A | 11/1989 | Park |
| 4,977,311 A * | 12/1990 | Kusaka et al. ........... 250/201.8 |
| 5,138,460 A | 8/1992 | Egawa |
| 5,157,497 A * | 10/1992 | Topper et al. .............. 348/615 |
| 5,187,754 A * | 2/1993 | Currin et al. .............. 382/284 |
| 5,189,529 A * | 2/1993 | Ishiwata et al. ............ 358/451 |
| 5,311,445 A * | 5/1994 | White ...................... 702/28 |
| 5,319,742 A * | 6/1994 | Edgar ...................... 345/601 |
| 5,381,174 A | 1/1995 | de Groot et al. |
| 5,444,478 A | 8/1995 | Lelong et al. |
| 5,489,940 A * | 2/1996 | Richardson et al. ......... 348/315 |
| 5,960,125 A * | 9/1999 | Michael et al. ............ 382/294 |
| 5,969,372 A | 10/1999 | Stavely et al. |
| 5,982,951 A | 11/1999 | Katayama et al. |
| 5,999,651 A * | 12/1999 | Chang et al. ............... 382/215 |
| 6,031,974 A * | 2/2000 | Takahashi et al. ........... 358/1.9 |
| 6,058,248 A * | 5/2000 | Atkins et al. ............... 358/1.2 |
| 6,101,288 A * | 8/2000 | Kang ...................... 382/276 |
| 6,122,017 A | 9/2000 | Taubman |
| 6,173,087 B1 * | 1/2001 | Kumar et al. .............. 382/284 |
| 6,181,441 B1 | 1/2001 | Walsh |
| 6,348,981 B1 | 2/2002 | Walsh |
| 6,504,625 B1 * | 1/2003 | Amero et al. .............. 358/1.9 |
| 6,515,763 B1 * | 2/2003 | Dermer et al. ............. 358/1.9 |
| 6,597,816 B1 * | 7/2003 | Altunbasak et al. ........ 382/275 |
| 6,714,249 B2 | 3/2004 | May et al. |
| 6,727,864 B1 * | 4/2004 | Johnson et al. ............ 345/1.3 |
| 6,760,485 B1 * | 7/2004 | Gilman et al. ............. 382/274 |
| 6,813,391 B1 | 11/2004 | Uyttendaele et al. |
| 6,833,862 B1 | 12/2004 | Li |

(Continued)

*Primary Examiner*—Vikkram Bali
*Assistant Examiner*—Michelle Entezari

(57) ABSTRACT

A method of correcting vignetting in an image. The image includes a plurality of pixels, each pixel having an intensity. The image is flattened by adjusting the intensity of each pixel based on a vignette function representative of vignetting characteristics of the image, the vignette function having a plurality of free parameters, each free parameter having a value. A vignette metric is determined based on the flattened image. The values of one or more of the free parameters are adjusted based on the vignette metric, and the flattening is performed based on the adjusted values of the free parameters.

20 Claims, 4 Drawing Sheets

U.S. PATENT DOCUMENTS

| | | | |
|---|---|---|---|
| 6,970,592 B2* | 11/2005 | Fujimoto et al. | 382/154 |
| 7,038,712 B1* | 5/2006 | Livingston et al. | 348/187 |
| 7,046,401 B2* | 5/2006 | Dufaux et al. | 358/450 |
| 7,046,839 B1* | 5/2006 | Richer et al. | 382/154 |
| 7,098,945 B1* | 8/2006 | Sasai et al. | 348/223.1 |
| 7,136,508 B2* | 11/2006 | Asano et al. | 382/107 |
| 2002/0041653 A1* | 4/2002 | Wilkins et al. | 378/98.9 |
| 2002/0057345 A1* | 5/2002 | Tamaki et al. | 348/207 |
| 2002/0097411 A1* | 7/2002 | Roche et al. | 358/1.9 |
| 2002/0131649 A1* | 9/2002 | Yamaguchi | 382/275 |
| 2002/0181786 A1* | 12/2002 | Stark et al. | 382/225 |
| 2002/0186425 A1* | 12/2002 | Dufaux et al. | 358/497 |
| 2002/0190216 A1* | 12/2002 | Ducourant | 250/370.11 |
| 2003/0006770 A1* | 1/2003 | Smith | 324/309 |
| 2003/0011607 A1* | 1/2003 | Spaulding et al. | 345/581 |
| 2003/0071891 A1* | 4/2003 | Geng | 348/39 |
| 2003/0081813 A1* | 5/2003 | Astle | 382/103 |
| 2003/0112339 A1* | 6/2003 | Cahill et al. | 348/218.1 |
| 2003/0202000 A1* | 10/2003 | Kudo et al. | 345/690 |
| 2004/0070565 A1* | 4/2004 | Nayar et al. | 345/156 |
| 2004/0100443 A1* | 5/2004 | Mandelbaum et al. | 345/158 |
| 2004/0141157 A1* | 7/2004 | Ramachandran et al. | 353/70 |
| 2004/0150726 A1* | 8/2004 | Gallagher | 348/222.1 |
| 2004/0167709 A1* | 8/2004 | Smitherman et al. | 701/208 |
| 2004/0257454 A1* | 12/2004 | Pinto et al. | 348/222.1 |
| 2005/0007460 A1* | 1/2005 | Stavely et al. | 348/222.1 |
| 2005/0008207 A1* | 1/2005 | Brown | 382/128 |
| 2005/0018175 A1* | 1/2005 | Cheng | 356/124 |
| 2005/0030383 A1 | 2/2005 | Li | |
| 2005/0100242 A1* | 5/2005 | Trifonov et al. | 382/274 |
| 2005/0196040 A1* | 9/2005 | Ohara | 382/167 |
| 2005/0206750 A1* | 9/2005 | Aoyagi et al. | 348/238 |
| 2005/0275904 A1* | 12/2005 | Kido et al. | 358/461 |
| 2006/0007252 A1* | 1/2006 | Mahy et al. | 347/3 |
| 2006/0017807 A1* | 1/2006 | Lee et al. | 348/36 |
| 2006/0115181 A1* | 6/2006 | Deng et al. | 382/284 |
| 2006/0269125 A1* | 11/2006 | Kalevo et al. | 382/162 |
| 2007/0031024 A1* | 2/2007 | Albeck et al. | 382/141 |
| 2007/0211154 A1* | 9/2007 | Mahmoud et al. | 348/251 |

* cited by examiner

SYSTEM AND METHOD FOR CORRECTING IMAGE VIGNETTING

BACKGROUND

Image vignetting refers to an effect where border areas of an image, particularly the corners, are darker relative to the center of the image. Vignetting is typically caused primarily by inherent design characteristics of lenses, which result in an uneven distribution of light upon the optical plane (e.g., film or image sensor) of a camera. Wide angle lenses and digital zoom lenses, especially at wider apertures, often create high levels of vignetting. Depending on the level, vignetting can be very noticeable and distract from the quality of the image. This is particularly true when creating a single panoramic image from one or more individual images, where vignetting causes the borders between the individual images to be darker than other areas of the image, resulting in the panoramic image having a "striped" appearance.

Vignetting can be automatically corrected when parameters associated with formation of the image (e.g., lens type, focal length, aperture settings, etc.) are known. However, such information is often not available for images. Several techniques have been developed for vignette correction, however, most involve comparison between multiple images from a moving camera. For example, one technique involves comparing the intensity of a same object in different images from a moving camera, wherein the object is located at a different position relative to the image center in each image. Vignetting correction is determined based on differences in intensity of the object between the two images.

While generally effective at correcting vignetting when multiple images from a moving camera are available, such techniques are not effective at correcting vignetting in multiple images from a camera having little or no motion, and are not applicable to correcting vignetting in a single image.

SUMMARY

In one embodiment, the present invention provides a method of correcting vignetting in an image. The image includes a plurality of pixels each having an intensity. The image is flattened by adjusting the intensity of each pixel based on a vignette function representative of vignetting characteristics of the image. The vignette function has a plurality of free parameters, each free parameter having a value. A vignette metric is determined based on the flattened image. The values of one or more of the free parameters are adjusted based on the vignette metric, and the flattening is performed based on the adjusted values of the free parameters.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims.

As described herein, a system, method, and program product for correcting vignetting in an image is provided. The system, method, and program product include correcting vignetting in an image based on a vignette function representative of vignetting characteristics of the image, the vignette function having at least one free parameter having an adjustable value. According to embodiments of the present invention, the value of the at least one free parameter is determined by flattening the image by adjusting the intensity of each pixel of the image based on the vignette function and palletizing the flattened image using a selected number of colors to create a rendered image. A vignette metric is determined based on the palettized and flattened images. In one embodiment, the vignette metric is based on a comparison of the pixel intensities of the palettized image to the pixel intensities of the flattened image. The value of the at least one free parameter is adjusted based on the vignette metric. In one embodiment, the flattening and palettizing of the image are repeated based on the adjusted value of the free parameter. In one embodiment, the flattening and palettizing of the image, the determining of the vignette metric, and the adjusting of the value of the at least one free parameter are repeated until the vignette metric is substantially optimized.

Figure 1:
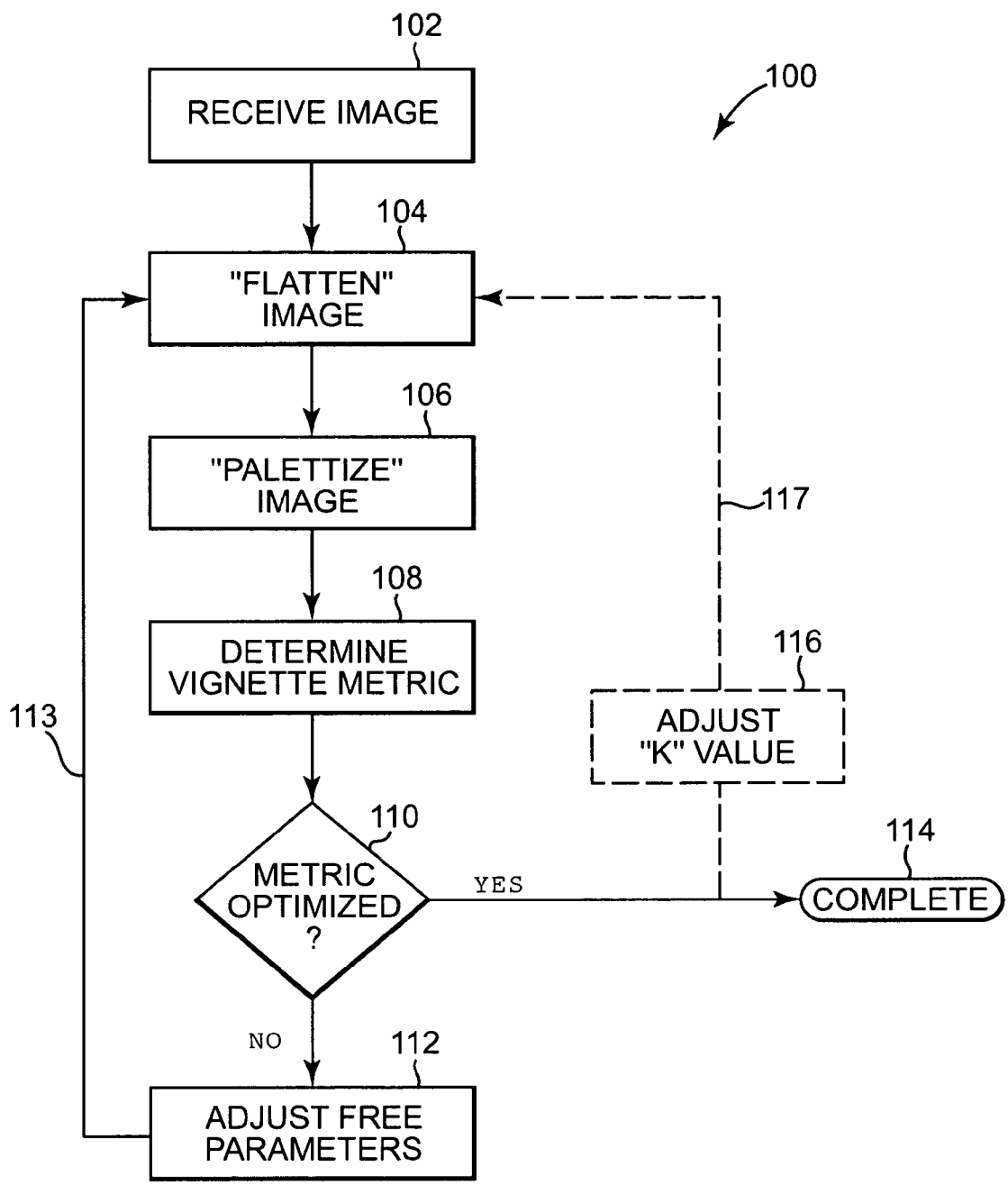
FIG. 1 is a flow diagram illustrating generally a process for correcting vignetting in an image according to one exemplary embodiment of the present invention.

FIG. 1 is a flow diagram illustrating generally one example of a process 100, according to embodiments of the present invention, for correcting vignetting in an image. Process 100 begins at 102 with receipt of a camera image, the image comprising a plurality of pixels each having a corresponding intensity (I). Pixels generally comprise three color channels (e.g., red (R), green (G), and blue (B)), with each color having a corresponding intensity. Although not specifically indicated, the term intensity (I) as used herein can refer to an average intensity of a pixel (based on the intensity of each color channel) and to the intensity of each individual color channel. As such, the teachings of the present invention can be applied to correct image vignetting based on average pixel intensities and intensities of the individual color channels of each pixel. In one embodiment, the pixels of each image are arranged in a plurality of rows and columns, wherein the number of pixels, rows ("x"), and columns ("y") can vary from image to image.

At 104, the camera image is "flattened." The term "flattening" refers generally to modifying, or correcting, the pixel intensities of the camera image so as to provide a substantially "ideal" image having no vignetting effects, as would be provided by the camera if an "ideal" lens were employed. As discussed in the Background section, image vignetting is typically caused primarily by inherent design characteristics of lenses. Generally speaking, all lenses, even those otherwise considered to be "perfect" lenses, produce some degree of image vignetting. Vignetting results from geometric characteristics of lenses. Light entering a lens along its objective axis, which forms portions of the center of the image, "sees" a projected cross-section of the lens generally having the shape of a circle. However, light entering at an angle relative to the objective axis, which forms portions of the edges of the image, "sees" a shortened projected cross-section of the lens generally having the shape of an ellipse. Since the area of the ellipse is less than that of the circle, less light is incident upon the areas of the optical plane corresponding to the edges of the image than is incident upon the areas of the optical plane corresponding to the center of the image. Consequently, the edges of the image will be darker than the center of the image.

This geometric characteristic is commonly referred to as the Cosine-4 law. Generally speaking, based on the geometry of a simple lens, the Cosine-4 law states that the amount of light incident upon an optical plane associated with the lens is proportional to the cosine of the angle of incidence of the light relative to the optical axis of the lens raised to the power of four. As a basic example, when using a simple lens having an angle of view of 20 degrees, where the maximum off-axis angle of incidence is 10 degrees, the corners of the image will receive an amount of light substantially equal to $\cos^4(10$ degrees), or approximately 94 percent, as much light as the center of the image.

One function commonly employed to model vignetting effects, which is based on the Cosine-4 law, is expressed by Equation I below:

$$I(x,y) = I'(x,y) * \cos^4(\arctan(\theta*(x^2+y^2))) \qquad \text{Equation I:}$$

where
x, y=pixel coordinates (row "x", column "y");
θ=angular extent of pixel;
I'(x,y)=Ideal pixel intensity in absence of vignetting; and
I(x,y)=Pixel intensity of original camera image.

The angular extent (θ) of a pixel, as will be described in greater detail below, refers to how many degrees of a field of view of an image are displayed by a pixel.

Often times, an image may be cropped so that the optical center of the image is not known. If an image has been cropped, Equation I can be generalized for a different center, as expressed by Equation II below:

$$I(x,y) = I'(x,y) * \cos^4(\arctan(\theta*((x-dx)^2+(y-dy)^2))) \qquad \text{Equation II:}$$

where
x, y=pixel coordinates (row "x", column "y");
θ=angular extent of pixel;
dx, dy=coordinates of the center of vignetting;
I'(x,y)=Ideal pixel intensity in absence of vignetting; and
I(x,y)=Pixel intensity of original camera image.

Often times, the pixel intensities of the image have been adjusted by an exponential gain that is not known. Such an adjustment, commonly referred to as gamma adjustment, is a technique used to adjust pixel values so as to be properly displayed on a monitor, or other viewing device, that employs a non-linear relationship between pixel intensities and display intensities. The gain exponent to which each pixel is raised is commonly referred to as gamma (γ). While different imaging devices may employ different gamma values, digital cameras often employ a gamma value of 2.2. Equation II can be modified so as to account for potential gamma adjustment as expressed by Equation III below:

$$I(x,y)^\gamma = I'(x,y) * \cos^4(\arctan(\theta*((x-dx)^2+(y-dy)^2)))^\gamma \qquad \text{Equation III:}$$

where
x, y=pixel coordinates (row "x", column "y");
θ=angular extent of pixel;
dx, dy=coordinates of the center of vignetting;
γ=the gain exponent of the image;
I'(x,y)=Ideal pixel intensity in absence of vignetting; and
I(x,y)=Pixel intensity of original camera image.

Equation III can be simplified, as represented by Equation IV below:

$$I(x,y) = I'(x,y)^{\gamma} * \cos^{4\gamma}(\arctan(\theta*((x-dx)^2+(y-dy)^2))) \qquad \text{Equation IV:}$$

Equation IV can be further simplified as represented by Equation V below:

$$I(x,y) = I'(x,y)^{\delta} * \cos^{4\delta}(\arctan(\theta*((x-dx)^2+(y-dy)^2))) \qquad \text{Equation V:}$$

where
x, y=pixel coordinates (row "x", column "y");
θ=angular extent of pixel;
dx, dy=coordinates of the center of vignetting;
g=the cosine exponent of the image, including any gain exponent;
I'(x,y)=Ideal pixel intensity in absence of vignetting; and
I(x,y)=Pixel intensity of original camera image.

To determine the "ideal" pixel intensity in the absence of vignetting or, in other words, to determine the vignette-corrected pixel intensity, Equation V can be re-written as represented by Equation VI below:

Equation VI:

$$I'(x,y) = \frac{I(x,y)}{\cos^{\delta}(\arctan(\theta * ((x-dx)^2 + (y-dy)^2)))}$$

where
x, y=pixel coordinates (row "x", column "y");
θ=angular extent of pixel;
dx, dy=coordinates of the center of vignetting;
g=the cosine exponent of the image;
I'(x,y)=Ideal pixel intensity in absence of vignetting; and
I(x,y)=Pixel intensity of original camera image.

To "flatten" the camera image received at 102, each pixel of the image is adjusted by applying the vignette function as described above by Equation VI. However, in Equation VI, as described above, the variables θ, dx, dy, and g are free parameters, meaning that their values are unknown with respect to the camera image received at 102. Therefore, in order to "flatten" the image, values must be provided for each of the free parameters.

The angular extent, θ, of a pixel refers to how many degrees of a field of view of an image are displayed by the pixel. Angular extent is defined as the angular field of view of the camera divided by the number of pixels comprising a width of the image. Angular extent depends on a variety of factors such as, for example, the f-number of the lens (i.e. the magnification of the lens), the focal length of the lens, and the physical size of the pixel in the camera's image sensor (generally ranging from 3-12 microns).

On one end of the spectrum, a fisheye-type lens providing a 180 degree field of view on a VGA resolution camera (i.e. 640 pixels wide) would result in an angular extent of approximately 0.28 degrees per pixel (i.e., 180/640). On the other end of the spectrum, a camera employing a 1×, 40 degree lens with 20× zoom would have a 2 degree field of view. If the camera employs a sensor having 4,000 pixels across, the resulting angular extent would be approximately 0.0005 degrees per pixel (i.e. 2/4000). As such, the angular extent of a pixel will typically be within a range from 0.0005 to 0.28 degrees. However, typical consumer cameras generally employ a 1×, 40 degree lens with a 0.5× to 3× zoom, and employ image sensors ranging from 1,000-3,000 pixels in width. As such, the angular extent for typical consumer cameras generally ranges between 0.004 degrees (i.e. (40/0.5)/1000) and 0.08 degrees (i.e. (40/3)/3000).

In digital files, information related to the angular extent is often located in a header element of the image file. As such, the angular extent may be able to be determined from the header information. If not, an operator may be able to estimate the angular extent via inspection of the image.

The cosine exponent, g, is simply any gamma value, γ, that may be associated with the image multiplied by four. As described above, the intensity levels of the pixels of an image are sometimes exponentially increased based on the gamma value so as to be properly displayed on a monitoring system. Gamma values employed by monitoring systems generally range in value between 1 and 3, with a gamma value of 2.2 being the most common. Accordingly, the cosine exponent, g, generally ranges from 4 to 12, with a value of 8.8 considered to be the most likely value.

The free parameters dx and dy are representative of the coordinates of the center of vignetting relative to the center of the image. If an image is un-cropped, the center of vignetting is the same as the center of the image. However, if an image is cropped in an asymmetrical fashion, the center of vignetting will no longer correspond to the center of the image. In one scenario of asymmetrical cropping, an image may be "quartered", or cropped to one-fourth of its original size. This means that the center of vignetting of the cropped image could located at one of the corners of the cropped image. Thus, dx and dy could be respectively equal to one-half the width and height of the image. As such, the values of dx and dy will typically be within a range of $-\frac{1}{2}x$ to $+\frac{1}{2}x$ and $-\frac{1}{2}y$ to $+\frac{1}{2}y$, respectively. However, although an image may be cropped in any number of ways, images are often cropped in at least a somewhat symmetrical fashion. As such, in one embodiment, initial values for free parameter dx and dy are set to a value of "0" (i.e. the center of the image).

Initially, the values of each of the four free parameters are set to what is typically considered to be a common, or "standard", value. Thus, in one example embodiment, the initial values of the four free parameters θ, g, dx, and dy are respectively set to values of 0.04, 8.8, 0, and 0, wherein the value of 0.04 degrees for the angular extent is approximately at the center of the range for a typical consumer camera. In a case where the angular extent is known based on header information associated with the image file, the initial value for the angular extent is set to the known value. Based on the initially selected values for the free parameter, the camera image received at 102 is adjusted, or flattened, by applying the vignette function as described above by Equation VI to each pixel of the camera image.

Process 100 then proceeds to 106 where the "flattened" image determined above at 104 is "palettized" to create a rendered image. Palettization generally refers to a process where a "full color" image having a color palette comprising a large number of colors (e.g., a 24-bit color image has over 16 million possible color values) is converted to an image having a color palette comprising a reduced number of colors. In other words, palettization is a process in which a decreased number of colors are used to represent an image. Palettization is typically employed when an image having a large palette of colors is to be displayed on a screen having a limited number of color values. In the present invention, as will be described in greater detail below, palettization is employed to determine the extent to which the flattened image determined at 104 has been corrected for vignetting effects.

In one embodiment, the present invention employs the K-means clustering method to render, or palettize, the image. K-means clustering, as generally known to those skilled in the art, is a partitioning method that partitions data points (e.g., pixel color values) in K mutually exclusive clusters and provides a vector of indices indicating to which of the K clusters each data point has been assigned.

The K-means method treats each data point as an object in space and determines a partition in which data points in each cluster are as close as possible to one another and as far as possible from data points in other clusters. Each cluster of the partition is defined by its member data points and by its centroid, which is the point to which the sum of distance from all member data points is minimized. The K-means method employs an iterative algorithm that minimizes the sum of distances from each member data point to the corresponding centroid over all clusters. The algorithm moves data points between clusters until the sum cannot be further decreased. Generally, K-means clustering enables several algorithm parameters to be selected such as, for example, the number of desired clusters, K, initial values for the cluster centroids.

With respect to the present invention, in one embodiment, the flattened image determined at 104 is a palettized by applying the K-means method to a vector of the three-dimensional color values of each pixel of the flattened image, where K corresponds to a selectable number of colors in the color palette of the rendered or palletized image. The number of colors (i.e. clusters) selected for rendering can comprise any number, but generally K is chosen to be a relatively small number. In one embodiment, the number of colors K in the color palette of the rendered image ranges between 5 and 10. In one embodiment, the value for the number of colors "K" is set to "5". In one embodiment, the value of K is initially set to a value of "5", but is varied as will be described in more detail below.

After palettizing or rendering the flattened image at 106, process 100 proceeds to 108, where a vignette metric is determined based on the flattened and rendered images determined respectively above at 104 and 106. As will be described in greater detail below, according to embodiments of the present invention, the vignette metric comprises a function that provides an indication of how well the rendered image determined at 106 matches the flattened image determined at 104.

In addition to vignetting, darkening of the edges of an image can be caused by other factors as well, such as, for example, naturally occurring lighting conditions or an object or scene that is naturally darker along its edges. However, luminance gradients of a typical scene or image, including contributions from such "natural" factors, generally have random, and small, magnitudes of change which are randomly oriented relative to the center of vignetting, whereas luminance gradients resulting from vignetting effects have predictable and "steady" magnitudes of change which are radially oriented relative to the center of vignetting. Sudden discontinuities in image brightness and color are due to naturally occurring image content, not vignetting.

Based on the differing nature of these color gradients, one characteristic of a typical scene or image that does not include vignetting is that it generally comprises a plurality of "flat" areas, or color regions, each comprising a relatively narrow range of shades or tones of a similar color. When palletizing such a scene or image, the pixels corresponding to these flat areas can be fit well (i.e. clustered and replaced) with a single color. However, in an image captured with a camera that introduces vignetting effects, these "flat" areas of the image are characterized by color gradients having a relatively large magnitude of change. When palettizing an image having vignetting effects, such color gradients are difficult to fit with a single color. As a result, an image or scene without vignetting can be better fitted to a reduced color palette (i.e. rendered more effectively) than an image that includes vignetting effects. In other words, the less vignetting an image includes, the better the palettized image will match the image from which it was derived.

As such, according to embodiments of the present invention, the match between the palettized image and the flattened image from which it is derived is employed as the vignette metric to estimate an amount of vignetting present in the flattened image (i.e. vignette-corrected image) determined above at 104. In one embodiment, the vignette metric comprises a function that measures a difference, or error, of a selected parameter between the rendered image determined at 106 and the flattened image determined at 104.

Although the vignette metric is described herein as being based on a difference between the palettized image and the flattened image from which it is derived, the vignette metric can be any suitable function representative of the characteristics of the color gradients of the flattened image, such as, for example, the rate of change of the color gradients.

In one embodiment, the vignette metric comprises the sum of the mean-square-error (MSE) between the intensity of each pixel in the palettized image determined at 106 and the intensity of the corresponding pixel in the flattened image determined at 104, where the value of the MSE is proportional to the amount of vignetting present in the flattened image. As such, the smaller the MSE, the better the palettized image matches the flattened image and the smaller the amount of vignetting present in the flattened image. Therefore, in one embodiment, process 100, at 108, determines the MSE between the palettized and flattened images respectively determined at 106 and 104. Process 100 then proceeds to 110.

At 110, process 100 queries whether the vignette metric has been optimized. If the answer to the query is "no", or the vignette metric is based on the initial set of values for the free parameters (as described above at 102), process 100 proceeds to 112. At 112, process 100 adjusts the values of one or more of the free parameters θ, g, dx, and dy based on the value of the vignette metric determined above at 108. As illustrated by FIG. 1 at 113, process 100 returns to 104, and 104 through 112 are repeated (i.e. iterated) until the vignette metric is substantially optimized at 110.

When the vignette metric is substantially optimized, the answer to the query at 110 is "yes", and the vignette correction of process 100 is complete, as indicated at 114. Upon completion of process 100, the flattened image determined at 104 resulting in the vignette metric being substantially optimized comprises the vignette-corrected image. Additionally, the vignette function with the free parameters having values as determined by the iterative process of 104 through 112 that produce the vignette-corrected image is considered to be the optimal vignette function.

In one embodiment, where the vignette metric comprises the sum of the mean-square-error (MSE) between the intensity of each pixel in the palettized image determined at 106 and the intensity of the corresponding pixel in the flattened image determined at 104, the vignette metric is substantially optimized when the MSE is substantially minimized.

In one embodiment, the MSE is substantially minimized when the value of the MSE of the present iteration is greater than the value of the MSE of the preceding iteration, and the flattened image determined by the preceding iteration comprises the vignette-corrected image. In one embodiment, the MSE is substantially minimized when the value of the MSE of the present iteration is less than the value of the MSE of the preceding iteration by less than a predetermined amount, and the flattened image determined by the present iteration comprises the vignette-corrected image.

By adjusting the values of the free parameters for the vignette function so as to optimize a match between the palettized image and the flattened image from which the palettized image is derived, a vignetting correction process according to the present invention (e.g., process 100) is able to automatically correct vignetting effects in a single image without knowledge of parameters associated with formation of the image (e.g., type of camera, camera settings, lens type, aperture settings, center of vignetting, etc.). As such, a vignetting correction process according to the present invention does not require multiple images from a camera to perform vignetting correction. Furthermore, by comparing the palettized image to the flattened image, a vignetting correction process according to the present invention is able to substantially correct darkening effects caused by vignetting without substantially correcting naturally occurring darkening effects.

In one embodiment, as illustrated by the dashed elements at 116, after determining that the vignette metric is substantially optimized at 110, process 100 adjusts the number of colors, K, in the color palette employed by the palettizing algorithm at 106. Process 100 then returns to 104, and 104 through 112 are repeated using the adjusted value for K until the vignette metric is once again substantially optimized at 110. In one embodiment, adjusting the value for K at 116 and the corresponding iteration of 104 through 112 is repeated until the improvements in the vignette metric cease and/or are less than a predetermined incremental amount.

With regard to 112 of process 100, various known methods can be employed to adjust the values of the free parameters. In one embodiment, the values of the free parameters are adjusted using known non-linear regression techniques, such as, for example, non-linear least-squares-fit techniques, linearization techniques (e.g., Taylor series), Marquardt's procedure, steepest descent techniques, and grid search techniques. In one embodiment, process 100 applies a predetermined plurality of combinations of the free parameters with the vignette function at 104, with the flattened image corresponding to the optimal vignette metric resulting from application of the plurality of combinations of the free parameters being the vignette-corrected image.

Figure 2:
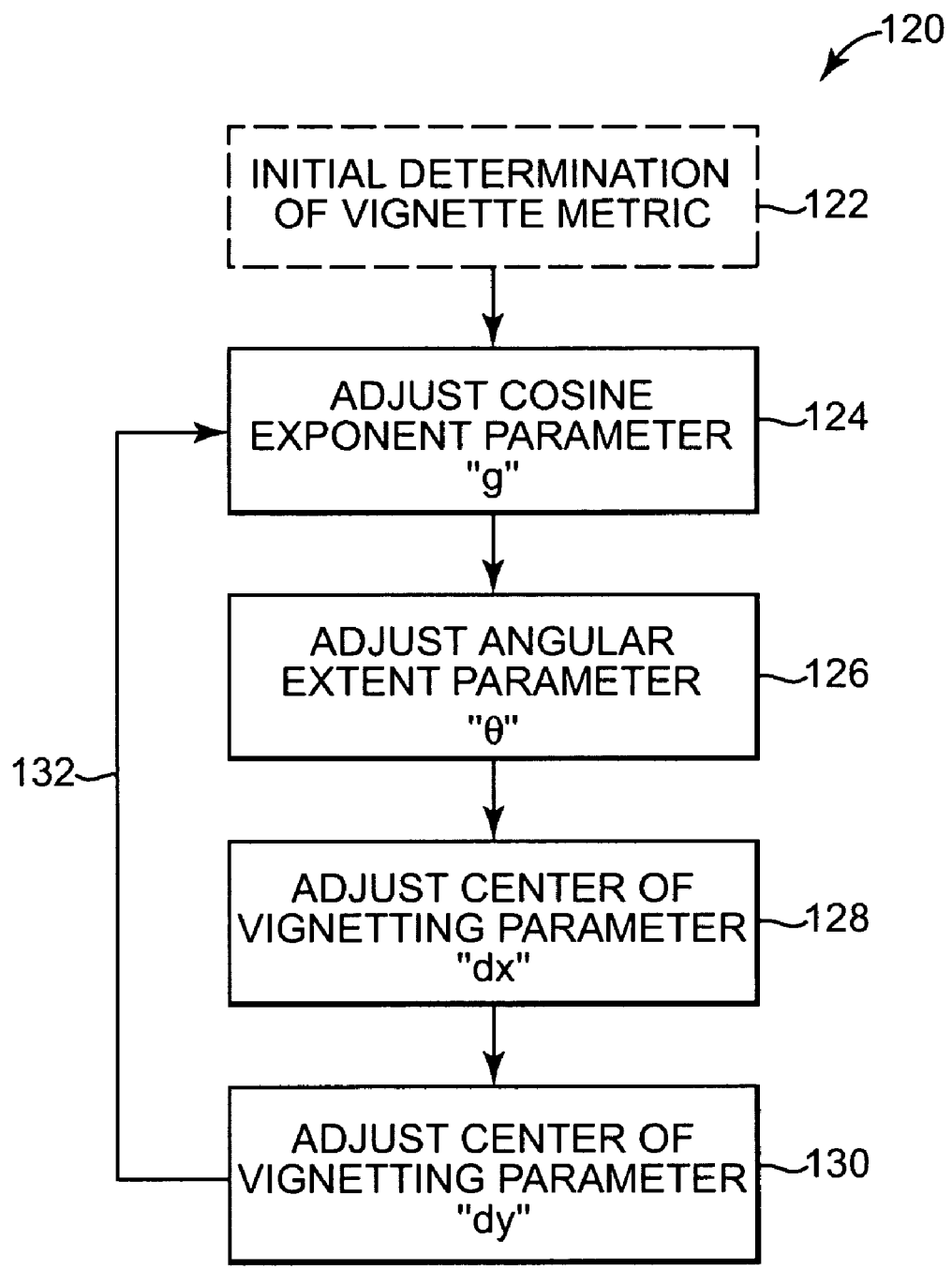
FIG. 2 is a flow diagram illustrating generally a process for adjusting free parameters suitable for use with the process of FIG. 1 according to one exemplary embodiment of the present invention.

FIG. 2 is a flow diagram illustrating one example of a process 120 for adjusting the values of the free parameters at 112 to determine a substantially optimized vignette metric at 110 of process 100 in accordance with the present invention. As illustrated by FIG. 2, process 120 successively adjusts the value of one of the free parameters to determine the combination of values for the free parameters that results in a substantially optimized vignette metric. Process 120 is employed after initial values for each of the four free parameters have been selected at 104 and the flattened image, palettized image, and vignette metric have been respectively determined at 104, 106, and 108 of process 100, as indicated by the dashed block 122.

Process 120 begins at 124 with adjustment of the cosine exponent parameter, g. At 124, while maintaining the values of the remaining free parameters at the initial values set at 122, process 120 adjusts the value of the cosine exponent, g, until the vignette metric at 108 of process 100 is substantially optimized. Process 120 then proceeds to 126.

At 126, while maintaining the center of vignetting parameters, dx and dy, at the initial values set at 122 and the value of cosine exponent, g, at the value determined at 124, process 120 adjusts the value of the angular extent parameter, θ, until the vignette metric at 108 of process 100 is substantially optimized. Process 120 then proceeds to 128.

At 128, while maintaining the center of vignetting parameter, dy, at the initial value set at 122 and the values of the cosine exponent, g, and the angular extent parameter, θ, at the values determined respectively at 124 and 126, process 120 adjusts the value of the center of vignetting parameter, dx, until the vignette metric at 108 of process 100 is substantially optimized. Process 120 then proceeds to 130.

At 130, while maintaining the values of the cosine exponent, g, the angular extent parameter, θ, and the center of vignetting parameter, dx, at the values determined respectively at 124, 126, and 128, process 120 adjusts the value of the center of vignetting parameter, dy, until the vignette metric at 108 of process 100 is substantially optimized.

In one embodiment, as illustrated at 132, process 120 iterates 124 through 130 based on the adjusted values of the free parameters, in lieu of the initial values set as described at 122, to better optimize the value of the vignette metric determined at 108 of process 100. In one embodiment, process 120 repeats 124 through 130 a predetermined number of iterations.

Although described herein primarily with respect to a single image, systems and methods of vignetting correction in accordance with the present invention are suitable for correcting vignetting effects of a collection of related images. For example, vignetting correction process 100, as described above with respect to FIGS. 1 and 2, can be adapted to correct vignetting in a series of images of a movie/video taken by a single imaging device and to correct vignetting in panoramic images formed by one or more images taken by the same or similar imaging devices.

Figure 3A:
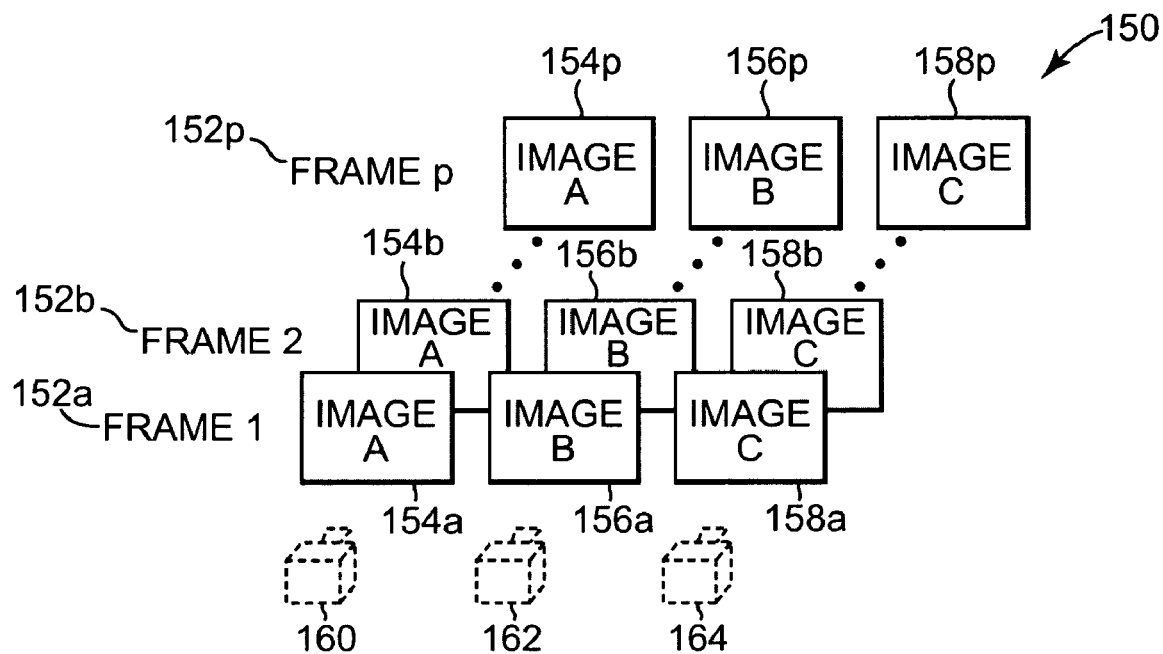
FIG. 3A illustrates generally an example of a shot of a panoramic movie/video.

FIG. 3A illustrates generally an example of a shot 150 of a panoramic movie/video comprising a sequence of frames, illustrated as frames 152*a* through 152*p*. Each frame 152 of shot 150 comprises a sequence of three images, with each image being at a different position in the sequence. As illustrated, each frame 152 comprises an image 154 in an image position "A", an image 156 in an image position "B", and an image 158 in an image position "C". When making a panoramic video or movie, three cameras are often employed, such as cameras 160, 162 and 164, with each camera providing one image of the sequence of each frame 152. As illustrated, cameras 160, 162, and 164 respectively provide images 154, 156, and 158 of each frame 152, such as images 154*a*, 156*a*, and 158*a* of frame 152*a*.

Figure 3B:
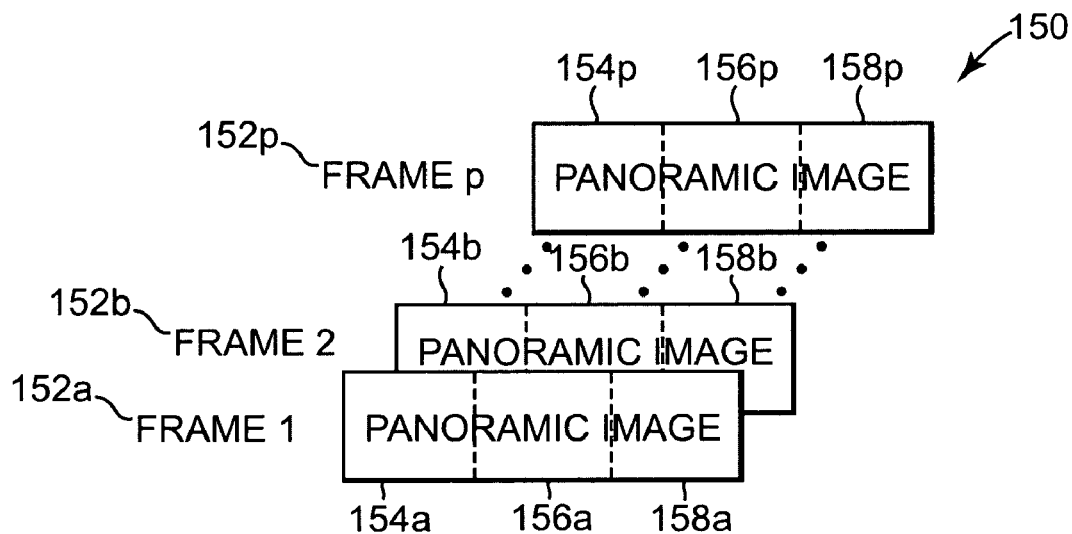
FIG. 3B illustrates generally an example of a panoramic movie/video formed by the shot of images illustrated by FIG. 3A.

As known to those skilled in the art, to form a panoramic movie/video, the images of each frame are subsequently stitched together to form a single panoramic image of the scene, as illustrated generally by FIG. 3B. If vignetting is present in the individual images, the border areas between the individual images will appear darker than other areas of the panoramic image, resulting in the panoramic image having a striped appearance.

In one embodiment, a vignetting correction process in accordance with the present invention, such as process 100 as described above, can be applied so as to separately correct the vignetting in each image of each frame of a shot of a panoramic movie/video, such as each image of frames 152 of shot 150. In one embodiment, if the cameras employed to provide the images of each frame are substantially similar (e.g., similar and/or same camera, similar settings, similar lenses, etc.), a vignetting correction process in accordance with the present invention, such as process 100, can be adapted so as to perform vignetting correction based on vignetting characteristics of multiple images.

For example, in one embodiment, vignetting correction process 100 is applied to each individual image of shot 150 illustrated by FIG. 3A, such that the vignette metric associated with each image is substantially optimized. In one embodiment, an average value for each of the free parameters is determined for the free parameters associated with the optimized vignette metrics of all images at a same image position in each frame 152 of shot 150. A same vignetting function, one corresponding to each image position, is applied to all images at a same image position in each frame 152 of shot 150, wherein the vignetting function employs the average values of the free parameters of the optimized vignette metrics associated with the images at the corresponding image position.

For example, with reference to FIG. 3A, an average value is determined for each of the free parameters associated with the optimized vignette metrics of images 154*a* through 154*p* at image position "A" of shot 150. A same vignetting function employing the averaged free parameter values is then applied to each of the images 154*a* through 154*p* at image position "A" of shot 150. This process is repeated for each image position of the frame. In the illustrated example, the process is repeated for image positions "B" and "C" of shot 150.

By applying a same vignetting function employing averaged free parameter values to each image at a same image position, vignette correction is more uniform across the frames of a shot. As a result, potential "flickering" effects due to varying pixel intensities between frames and potential effects resulting from anomalous intensity gradients present in one or more of the images will be lessened.

In one embodiment, in a fashion similar to that described above with respect to images at a same image position, vignetting correction is performed on a frame-by-frame basis. For example, average values are determined for each of the free parameters associated with the optimized vignette metrics of all images of a same frame, such as images 154*a*, 156*a*, and 158*a* of frame 152*a* of shot 150. A same vignetting function employing the averaged free parameter values is then applied to each of the images 154*a*, 156*a*, and 158*a*. This process is repeated for each frame, 152*a*, through 152*p*, to correct vignetting of shot 150.

Figure 4:
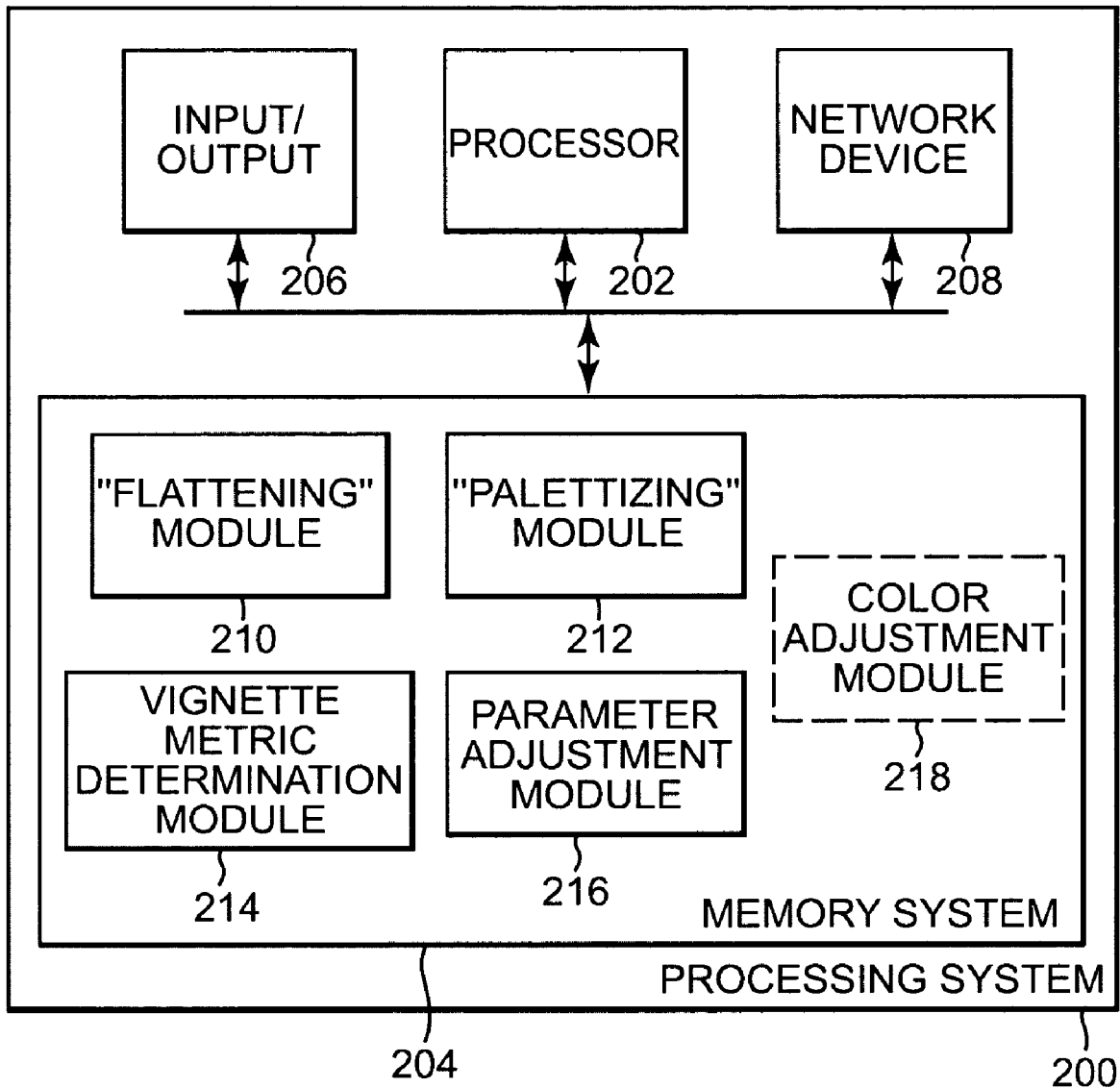
FIG. 4 is a block diagram illustrating a processing system for correcting vignetting in an image according to one exemplary embodiment of the present invention.

FIG. 4 is a block diagram illustrating a processing system 200 configured to correct vignetting in images in accordance with embodiments of the present invention. Processing system 200 comprises a processor 202, a memory system 204, an input/output 206, and a network device 208. Memory system 204 comprises a flattening module 210, a palettizing module 212, a vignette metric determination module 214, and a parameter adjustment module 216. In one embodiment, processing system 200 further includes a color adjustment module 218. Processing system 200 comprises any type of computer system or portable or non-portable electronic device. Examples include desktop, laptop, notebook, workstation, or server computer systems. Examples of electronic devices include digital cameras, digital video cameras, printers, scanners, mobile telephones, and personal digital assistants.

In one embodiment, flattening module 210, palettizing module 212, vignette metric determination module 214, parameter adjustment module 216, color adjustment module 218 each comprise instructions stored in memory system 204 that are accessible and executable by processor 202. Memory system 204 comprises any number of types of volatile and non-volatile storage devices such as RAM, hard disk drives, CD-ROM drives, and DVD drives. In other embodiments, each of the modules 210 through 218 may comprise any combination of hardware, firmware, and software components configured to perform the functions described herein.

A user of processing system 200 controls the operation of flattening module 210, palettizing module 212, vignette metric determination module 214, parameter adjustment module 216, and color adjustment module 218 by providing inputs and receiving outputs via input/output unit 206. Input/output unit 206 may comprise any combination of a keyboard, mouse, display device, or other input/output device that is coupled directly, or indirectly, to processing system 200.

Flattening module 210, palettizing module 212, vignette metric determination module 214, parameter adjustment module 216, and color adjustment module 218 may each be stored on a medium separate from processing system 200 prior to being stored in processing system 200. Examples of such a medium include a hard disk drive, a compact disc (e.g., a CD-ROM, CD-R, or CD-RW), and a digital video disc (e.g., a DVD, DVD-R, or DVD-RW). Processing system 200 may access flattening module 210, palettizing module 212, vignette metric determination module 214, free parameter adjustment module 216, and color adjustment module 218 from a remote processing or storage system (not shown) that comprises the medium using network device 208.

In operation, processing system 200 receives an image comprising a plurality of pixels, each pixel having an intensity. Processing system 200 executes flattening module 210 to flatten the image by adjusting the intensity of each pixel based on a vignette function representative of vignetting characteristics of the image, the vignette function having a plurality of free parameters each having a value, such as described at 104 of process 100 of FIG. 1.

Processing system 200 then executes palettizing module 212 to palettize the flattened image using a selected number of colors to create a rendered image, such as described at 106 of process 100 of FIG. 1. Processing system 200 then executes vignette metric determination module 214 to determine a vignette metric based on a comparison of the rendered image to the flattened image respectively created by the palletizing module 212 and flattening module 210, such as described at 108 of process 100 of FIG. 3. In one embodiment, vignette metric determination module 214 further determines whether the vignette metric is substantially optimized, such as described with respect to 110 of process 100 of FIG. 1.

Processing system 200 executes parameter adjustment module 216 to adjust the values of one or more of the free parameters of the vignetting function based on the vignette metric determined by vignette metric determination module 214. In one embodiment, processing system 200 iterates the execution of flattening module 210, palettizing module 212, vignette metric determination 214, and parameter adjustment module 216 until the vignette metric is determined to be substantially optimized by vignette metric determination module 212, such as described with respect to 110 and 112 of process 100 of FIG. 1 and with respect to process 120 of FIG. 2.

In one embodiment, after the vignette metric is substantially optimized, processing system executes color adjustment 218 to adjust the number of colors, K, in the color palette employed by palettizing module 212 to create the rendered image from the flattened image. Processing system then repeats the process of optimizing the vignette metric based on the adjusted number of colors, such as described with respect to 116 of process 100 of FIG. 1.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of correcting vignetting in an image comprising:
    receiving, in a processing system, an image comprising a plurality of pixels each having an intensity;
    flattening the images using a processor of the processing system by adjusting the intensity of each pixel by applying a vignette function derived independently of the image and being representative of image vignetting characteristics, the vignette function having a plurality of free parameters, each free parameter representative of a vignetting factor and having a value;
    palettizing the flattened image with the processor using a selected number of colors to create a rendered image,
    determining a vignette metric using the processor by comparing the flattened image to the rendered image;
    using the processor, adjusting the values of at least one of the free parameters based on the vignette metric; and
    performing the flattening with the processor using the adjusted values of the free parameters.

2. The method of claim 1, including iteratively adjusting the values of at least one of the free parameters and performing the flattening and palettizing until the vignette metric is substantially optimized.

3. The method of claim 2, wherein the flattened image resulting in a substantially optimized vignette metric comprises a vignette-corrected image.

4. The method of claim 1, including selecting a vignette function.

5. The method of claim 1, wherein the vignette function is based on a Cosine 4 model.

6. The method of claim 1, wherein the vignette metric is based on a mean square error between the intensity of pixels of the rendered image and corresponding pixels in the flattened image.

7. The method of claim 1, wherein palettizing the flattened image is based on K-means clustering techniques.

8. The method of claim 1, including selecting initial values for the free parameters.

9. The method of claim 1, wherein adjusting the value of the free parameters is based on non-linear regression techniques.

10. The method of claim 1, wherein the adjusting the value of the free parameters is based on steepest descent techniques.

11. The method of claim 1, further including adjusting the number of colors employed for palettizing the flattened image.

12. A method for correcting vignetting in a collection of related images comprising:
    receiving in a processing system, a collection of related images, each image comprising a plurality of pixels with each pixel having an intensity;
    flattening each image using a processor of the processing system by adjusting the intensity of each pixel by applying a vignette function derived independently of the image and being representative of image vignetting characteristics, the vignette function having a plurality of free parameters, each free parameter representing a vignetting factor and having a value;
    palettizing each flattened image with the processor using a selected number of colors to create a rendered image;
    determining a vignette metric for each image using the processor by comparing the corresponding rendered image to the corresponding flattened image; and using the processor, iteratively adjusting the value of at least one of the free parameters of a set of free parameters associated with each image based on the corresponding vignette metric and performing the flattening and palettizing for each image until the corresponding vignette metric is substantially optimized.

13. The method of claim 12, including:

determining an average value for each of the free parameters associated with the substantially optimized vignette metrics of all images of the collection of related images; and flattening each image of the collection of related images by adjusting the intensity of each pixel based on a same vignette function, each free parameter of the vignette function having a value substantially equal to the corresponding average value.

14. A computer-readable medium including instructions executable by a computer for performing a process for correcting vignetting in an image, the image comprising a plurality of pixels each having an intensity, the process comprising:

flattening the image by adjusting the intensity of each pixel using a vignette function derived independently of the image and being representative of image vignetting characteristics, the vignette function having a plurality of free parameters, each free parameter representative of a vignetting factor and having a value;

palettizing the flattened image using a selected number of colors to create a rendered image;

determining a vignette metric based on comparing the flattened image to the rendered image;

adjusting the values of one or more of the free parameters based on the vignette metric; and performing the flattening based on the adjusted values of the free parameters.

15. The computer-readable medium of claim 14, including instructions for iteratively adjusting the values of the one or more of the free parameters and performing the flattening and palettizing until the vignette metric is substantially optimized.

16. The computer-readable medium of claim 14, including instructions for adjusting the number of colors employed for palettizing the flattened image to create the rendered image.

17. A system for processing an image comprising:

an input/output unit to receive an image comprising a plurality of pixels each having an intensity;

a flattening module, executed by a processor of the system, configured to flatten the image by adjusting the intensity of each pixel by applying a vignette function derived independently of the image and being representative of image vignetting characteristics, the vignette function having a plurality of free parameters, each free parameter representative of a vignetting factor and having a value;

a palettizing module, executed by the processor, for palettizing the flattened image using a selected number of colors to create a rendered image;

a vignette metric determination module, executed by the processor, configured to determine a vignette metric based on a comparison of the rendered image to the flattened image; and a parameter adjustment module, executed by the processor, configured to adjust the values of at least one of the free parameters based on the vignette metric.

18. The system of claim 17, wherein the system is configured to perform the flattening and the palettizing based on the adjusted values of the free parameters.

19. The system of claim 18, wherein the system is configured to iteratively perform the flattening, palettizing, and adjusting of the values of the free parameters until the vignette metric is substantially optimized.

20. The system of claim 17, including a color adjustment module configured to adjust the number of colors employed by the palettizing module to create the rendered image.

* * * * *

UNITED STATES PATENT AND TRADEMARK OFFICE
CERTIFICATE OF CORRECTION

PATENT NO. : 7,634,152 B2 Page 1 of 1
APPLICATION NO. : 11/074979
DATED : December 15, 2009
INVENTOR(S) : D. Amnon Silverstein It is certified that error appears in the above-identified patent and that said Letters Patent is hereby corrected as shown below:

In column 12, line 9, in Claim 1, delete "images" and insert -- image --, therefor.

In column 12, line 34, in Claim 5, delete "Cosine 4" and insert -- Cosine4 --, therefor.

Signed and Sealed this

Fifteenth Day of June, 2010

David J. Kappos
*Director of the United States Patent and Trademark Office*